(12) United States Patent
Azulay et al.

(10) Patent No.: US 11,036,447 B2
(45) Date of Patent: Jun. 15, 2021

(54) DOCUMENT PRINT RESTRICTION

(71) Applicant: Microsoft Technology Licensing, LLC, Redmond, WA (US)

(72) Inventors: Itamar Azulay, Mishmar Ayyalon (IL); Itay Levy, Givatayim (IL); Yossi Haber, Gannei Tikva (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/667,616

(22) Filed: Oct. 29, 2019

(65) Prior Publication Data
US 2021/0124536 A1 Apr. 29, 2021

(51) Int. Cl.
| G06K 15/00 | (2006.01) |
| G06F 3/12 | (2006.01) |
| G06F 16/904 | (2019.01) |
| G06F 21/60 | (2013.01) |
| G06F 21/62 | (2013.01) |
| G06F 16/957 | (2019.01) |

(52) U.S. Cl.
CPC .......... *G06F 3/1238* (2013.01); *G06F 3/1222* (2013.01); *G06F 16/904* (2019.01); *G06F 16/9577* (2019.01); *G06F 21/608* (2013.01); *G06F 21/6209* (2013.01)

(58) Field of Classification Search
CPC .. G06F 3/1238; G06F 16/904; G06F 16/9577; G06F 3/1222; G06F 21/608; G06F 21/6209; G06F 16/93; H04N 1/00838; H04N 1/387; H04N 1/4446
See application file for complete search history.

(56) References Cited

U.S. PATENT DOCUMENTS

| 6,914,691 B1* | 7/2005 | Sato ..................... G06F 21/608 358/1.14 |
| 7,472,821 B1* | 1/2009 | Buchanan ........... G06F 21/6209 235/375 |
| 9,268,958 B1* | 2/2016 | Kessler .................. G06F 21/62 |
| 2002/0078104 A1* | 6/2002 | Kagimasa ............ G06F 40/169 715/255 |
| 2004/0139326 A1* | 7/2004 | Ootsuka ............... G06F 21/606 713/176 |

(Continued)

OTHER PUBLICATIONS

"International Search Report and Written Opinion Issued in PCT Application No. PCT/US20/055182", dated Dec. 23, 2020, 10 Pages.

*Primary Examiner* — Moustapha Diaby
(74) *Attorney, Agent, or Firm* — Workman Nydegger

(57) ABSTRACT

Restricting the printing of sensitive electronic documents. After the client downloads a document (e.g., by viewing the document in a web browser), the client intercepts a print command, pauses the print, and issues a print request to a server. From a server perspective, upon receiving the request, the server determines whether the document is print restricted. If not, the print operation is permitted to proceed. If so, the server responds negatively to the print request and alters the document so that, even if printed, sensitive information is not printed. In another embodiment, the server may restrict printing prior to downloading a document. For example, the server may make the document read-only, or replace the document with another printable document that does not contain sensitive content.

20 Claims, 18 Drawing Sheets

(56) References Cited

U.S. PATENT DOCUMENTS

| | | | |
|---|---|---|---|
| 2006/0279785 A1* | 12/2006 | Onishi | H04N 1/00875 358/1.18 |
| 2009/0100060 A1 | 4/2009 | Livnat et al. | |
| 2010/0039663 A1* | 2/2010 | Ohsone | H04N 19/467 358/1.15 |
| 2010/0195143 A1* | 8/2010 | Kanemitsu | G06F 3/126 358/1.15 |
| 2012/0033244 A1* | 2/2012 | Kohno | H04N 1/4426 358/1.14 |
| 2012/0036452 A1* | 2/2012 | Coleman | G06F 21/55 715/751 |
| 2012/0117239 A1* | 5/2012 | Holloway | H04L 61/1511 709/226 |
| 2012/0224213 A1* | 9/2012 | Imamura | H04N 1/00846 358/1.14 |
| 2019/0132481 A1 | 5/2019 | Yasui et al. | |

* cited by examiner

← → C Sharepoint.com\path1 ☆ ⊃ ⋮

SharePoint

| CS | Contoso Site
Private Group |

🔍 Search This Site

Home
Conversations
Documents
Notebook
Site Contents
Recycle Bin
Edit

News

Quick Links

Activity

Documents    See All
+New ˅ ⊞ ≡    All Documents

📄 Name ˅
📄 ConfidentialFile.docx
📄 MoreConfidentialFile.pdf

Back
Forward
Reload

Save As...
Print
Cast
Translate To English

View Page Source
Inspect

DOCUMENT PRINT RESTRICTION

BACKGROUND

Computer networks allow electronic documents to be remotely viewed, downloaded, and potentially printed to a printer or file. As an example, the electronic document might be a web page. However, some document formats (hereinafter a "portable format") provide for much greater portability while preserving consistency of appearance. Essentially, such portable format documents (e.g., a PDF document) appear the same when printed as they do when viewed on a display of a computing system. When a physical document is passed around, no matter who possesses the document, and no matter where the document is viewed, we expect the document to appear the same. The portable format thus typically preserves the customary expectations we have when handling a physical document.

There are several conventional ways to access an electronic document. As one example, a web browser may be used to navigate to a web document (e.g., a web page) to thereby view a document. In this case, the document may actually be downloaded and rendered by the browser from the local computing system. Thus, if a user decides to print the document, the user can typically do so, unless settings of the document strictly indicate the document is for read-only purposes.

Some online applications allow documents to be viewed remotely. For example, some cloud-based applications allow documents to be remotely viewed and perhaps edited after appropriate authentication. After viewing, the user might attempt to print the document, triggering the document to be downloaded for immediate printing. This is true even for documents with sensitive content that are not for wide consumption. As an example, when the user selects to print an online editable document, the online service may convert the editable document into a portable format document prior to downloading that document to the user's computing system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to restriction of the printing of electronic documents—such as online documents. When a user accesses an electronic document (e.g., via a web browser or an online application), that electronic document may contain sensitive or confidential information that is not for viewing by a wider audience. However, if the user prints the document, the content of that document is now available to anyone who can come into possession of the document.

For instance, if the document is printed onto physical paper, the sensitive content is viewable by anyone coming into physical possession of the paper. If the document is printed to a file, that file may then be easily forwarded or shared and then accessed by others.

This all represents a potential security breach in the form of lowering guards that prevent unauthorized users from viewing sensitive or confidential material. The principles described herein protect against this risk by restricting the ability for a user to print an electronic document (e.g., to a printer or a file) that the user has been able to view or download.

In accordance with one embodiment described herein, from a client perspective, after the client computing system downloads a document (e.g., by viewing the document in a web browser), the user may try to print that document. The client computing system intercepts the print command, pauses the corresponding print operation, and issues a print request to a server computing system (e.g., the server that the client downloaded the document from). From a server perspective, upon receiving a request to print the document, the server computing system determines whether the document is print restricted. If not, the print operation is permitted to proceed. If so, the server computing system responds negatively to the print request and alters the document so that, even if printed, sensitive information is not printed. In either case, the print operation can then proceed, but sensitive information (if any) will not be printed.

As an example, when the document is downloaded, it might be downloaded with a stylesheet that governs how the document is presented. The document might be altered by the server computing system such that the stylesheet hides sensitive or confidential content from the print operation, and exposes (for purposes of printing) a previously hidden message that printing is forbidden.

In accordance with another embodiment herein, the server computing system may restrict printing prior to downloading a document. As an example, the user may have used an online application to view and perhaps edit a document. If the user issues a print command, the client computing system will download the document (e.g., in a portable format) for printing. However, the server computing system does not know whether a print command has been issued. Upon detecting receipt of a request to provide (e.g., download) a document, and upon determining that the document is print restricted, the server computing system alters the document so that the document is restricted from printing as requested, and then provides the altered document. Alternatively, the server computing system replaces the document with another document that does not have the sensitive information, and provides the replaced document.

As an example, if the document has metadata that indicates that the document will be printed, the document may be replaced with another document (e.g., a document that contains a simple message that printing of the document is restricted). On the other hand, it may be quite difficult for the server computing system to tell whether or not the document will be printed. Nevertheless, even in that case, the document may be altered by making the document read-only. The altered or replaced document is then downloaded. Thus, printing of sensitive content is again restricted.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A through 5D illustrate an example user experience when attempting to print a sensitive document in accordance with the first embodiment described herein;

FIGS. 7A through 7D illustrate an example user experience when attempting to print a sensitive document in accordance with the second embodiment described herein;

FIGS. 9A through 9C illustrate an example user experience when attempting to print a sensitive document in accordance with the second embodiment described herein.

DETAILED DESCRIPTION

Figure 1:
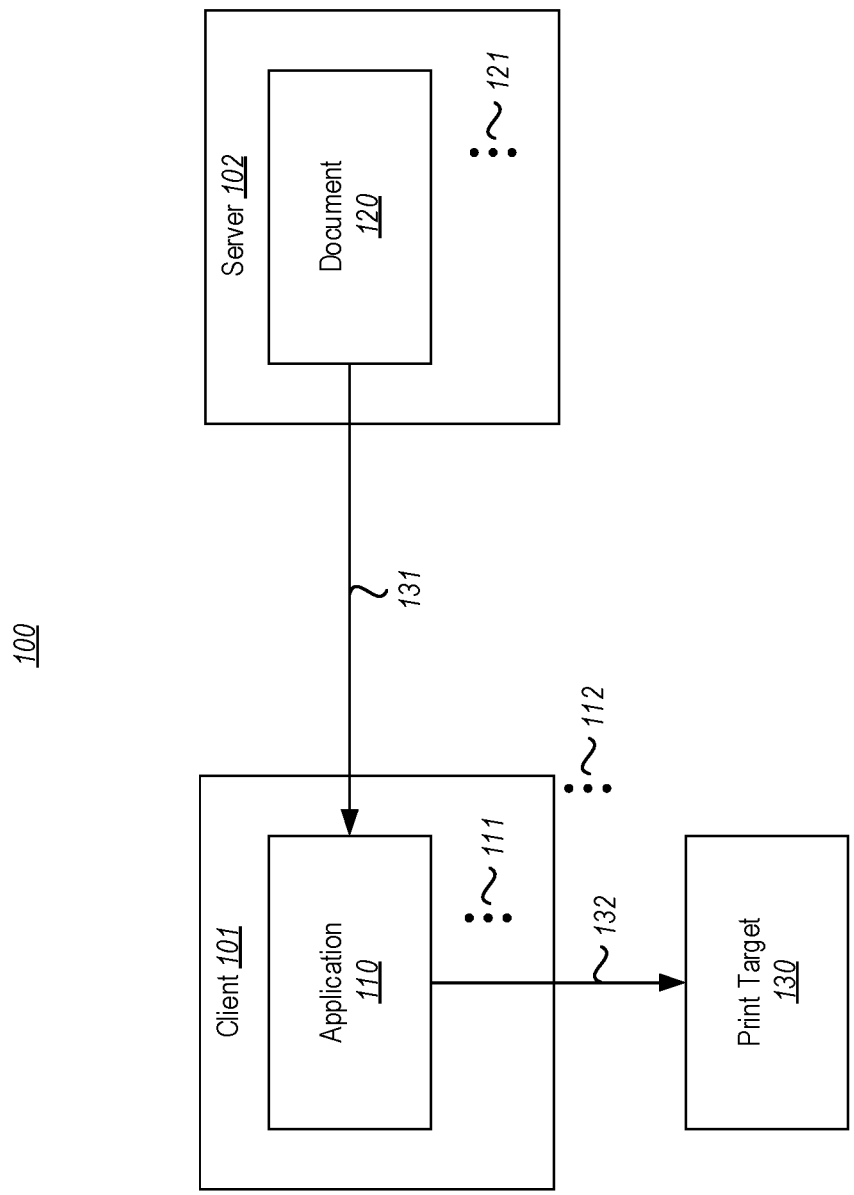
FIG. 1 illustrates a network environment in which the principles described herein may be employed, which includes a server computing system and a client computing system that can print to a print target.

At least some embodiments described herein relate to restriction of the printing of electronic documents—such as online documents. When a user accesses an electronic document (e.g., via a web browser or an online application), that electronic document may contain sensitive or confidential information that is not for viewing by a wider audience. However, if the user prints the document, the content of that document is now available to anyone who can come into possession of the document.

For instance, if the document is printed onto physical paper, the sensitive content is viewable by anyone coming into physical possession of the paper. If the document is printed to a file, that file may then be easily forwarded or shared and then accessed by others.

This all represents a potential security breach in the form of lowering guards that prevent unauthorized users from viewing sensitive or confidential material. The principles described herein protect against this risk by restricting the ability for a user to print an electronic document (e.g., to a printer or a file) that the user has been able to view or download.

In accordance with one embodiment described herein, from a client perspective, after the client computing system downloads a document (e.g., by viewing the document in a web browser), the user may try to print that document. The client computing system intercepts the print command, pauses the corresponding print operation, and issues a print request to a server computing system (e.g., the server that the client downloaded the document from). From a server perspective, upon receiving a request to print the document, the server computing system determines whether the document is print restricted. If not, the print operation is permitted to proceed. If so, the server computing system responds negatively to the print request and alters the document so that, even if printed, sensitive information is not printed. In either case, the print operation can then proceed, but sensitive information (if any) will not be printed.

As an example, when the document is downloaded, it might be downloaded with a stylesheet that governs how the document is presented. The document might be altered by the server computing system such that the stylesheet hides sensitive or confidential content from the print operation, and exposes (for purposes of printing) a previously hidden message that printing is forbidden.

In accordance with another embodiment herein, the server computing system may restrict printing prior to downloading a document. As an example, the user may have used an online application to view and perhaps edit a document. If the user issues a print command, the client computing system will download the document (e.g., in a portable format) for printing. However, the server computing system does not know whether a print command has been issued. Upon detecting receipt of a request to provide (e.g., download) a document, and upon determining that the document is print restricted, the server computing system alters the document so that the document is restricted from printing as requested, and then provides the altered document. Alternatively, the server computing system replaces the document with another document that does not have the sensitive information, and provides the replaced document.

As an example, if the document has metadata that indicates that the document will be printed, the document may be replaced with another document (e.g., a document that contains a simple message that printing of the document is restricted). On the other hand, it may be quite difficult for the server computing system to tell whether or not the document will be printed. Nevertheless, even in that case, the document may be altered by making the document read-only. The altered or replaced document is then downloaded. Thus, printing of sensitive content is again restricted.

FIG. 1 illustrates a network environment 100 in which the principles described herein may be employed. The network environment 100 includes a client computing system 101 and a server computing system 102. The client computing system 101 has an application 110 thereon that allows a user (not shown) of the client computing system 101 to view and download (as represented by arrow 131) a document 120 that is at the server computing system 102.

As an example only, the client computing system 101 may be structured as described below for the computing system 1000 of FIG. 10. Accordingly, the application 110 may be structured as described below for the executable component 1006 of FIG. 6. Also, in one example, the server computing system 102 is also structured as described below for the computing system 1000 of FIG. 10, although in the case of a server, there may be no need for a user interface 1012. The server computing system 102 may also be a cloud computing service that operates in a cloud computing environment.

Hereinafter, a client computing system may be simply referred to as a "client", and a server computing system may be simply referred to as a "server").

Furthermore, the client 101 may request to print the document 120 to a print target 130, as represented by arrow 132. As an example, in a physical print operation, the print target 130 could be a printer that prints the document 120 on physical material, such as paper. In a soft print operation, the print target 103 could be an electronic file so that the soft print operation creates a file that represents the document 120. If there is sensitive or confidential information within the document, any of these print operations could cause unauthorized release of information, and thus such printing represents a potential security breach.

Figure 2:
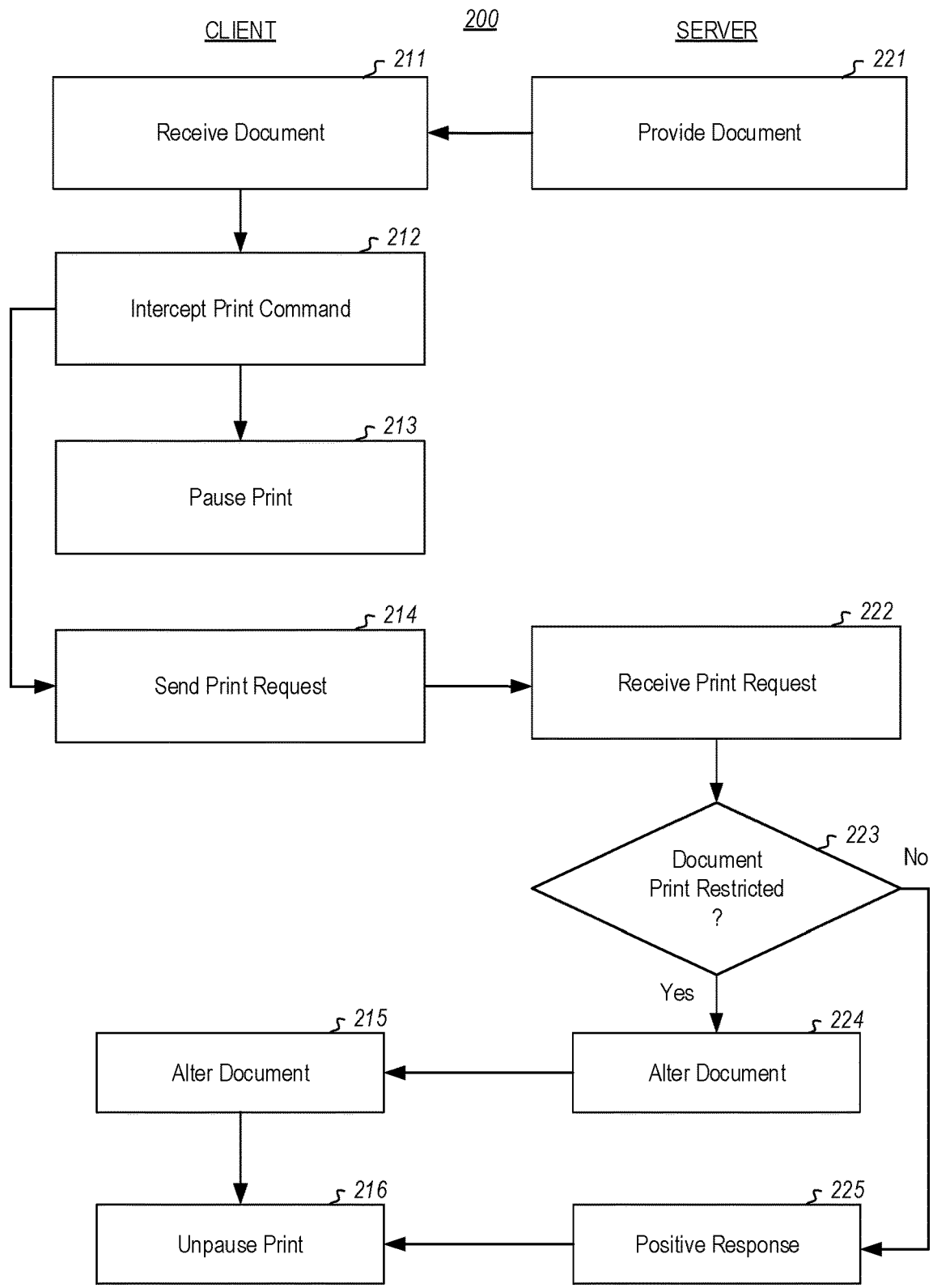
FIG. 2 illustrates a flowchart of a method for restricting printing of a document, in accordance with a first embodiment of the principles described herein.
Figure 6:
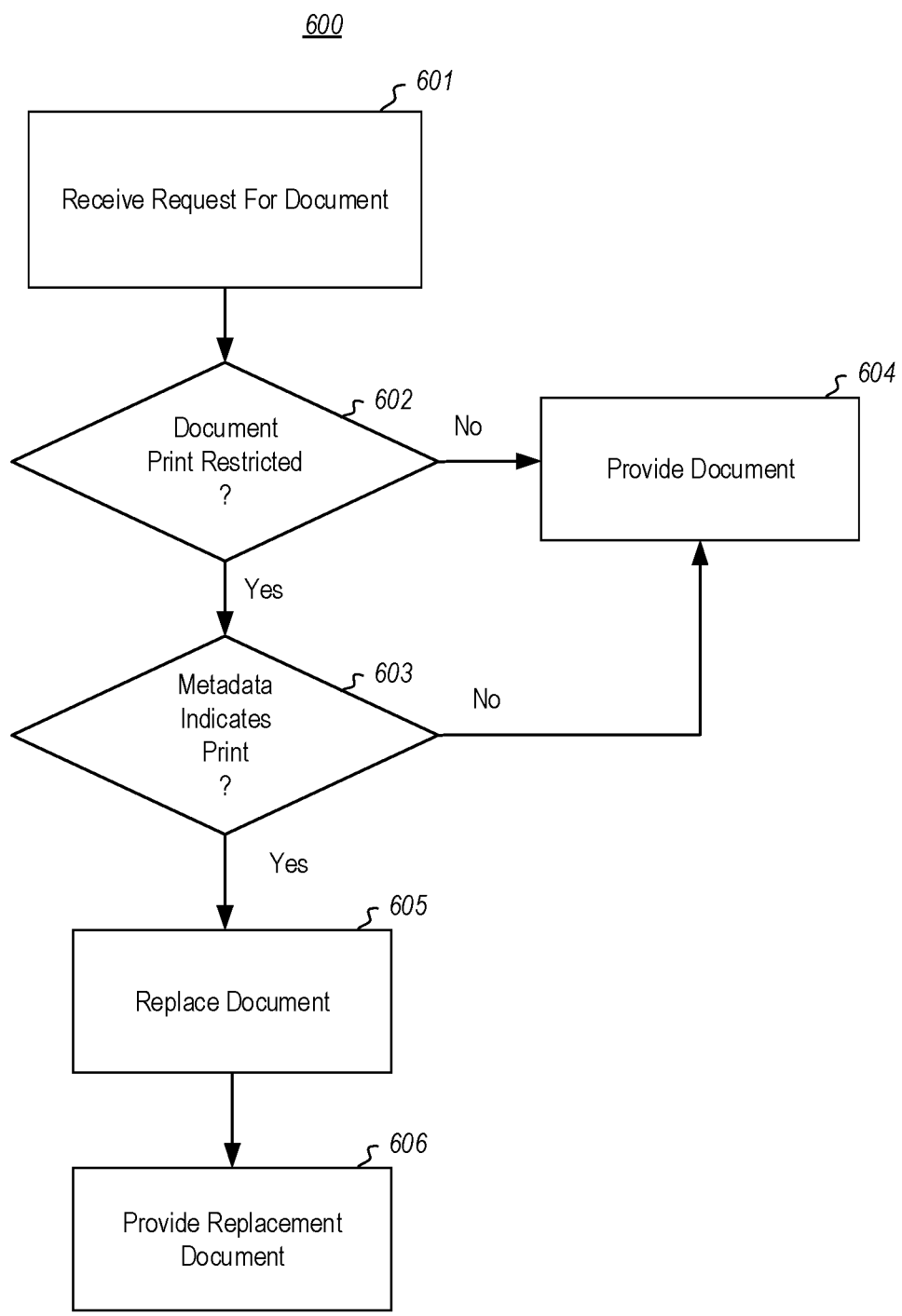
FIG. 6 illustrates a flowchart of a method for restricting printing of a document, in accordance with a second embodiment of the principles described herein.
Figure 8:
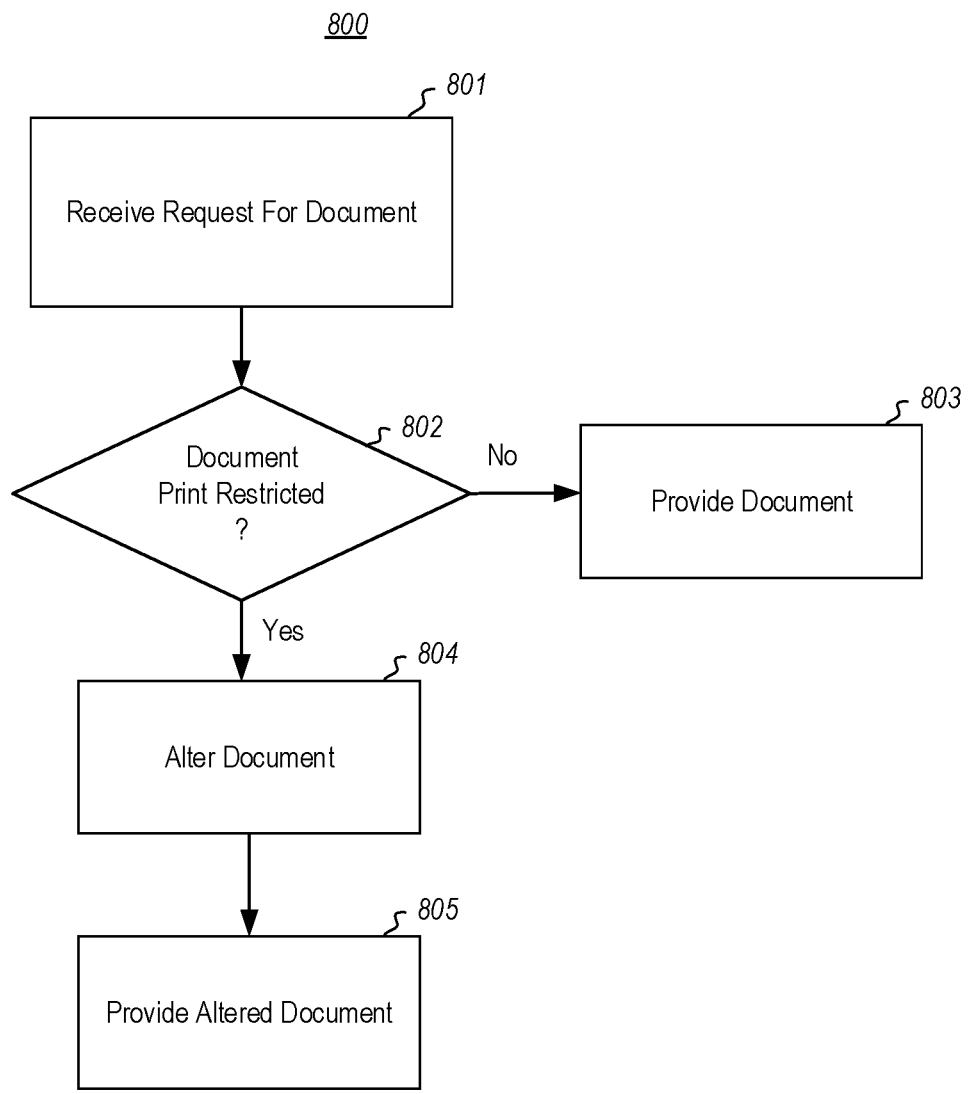
FIG. 8 illustrates a flowchart of a method for restricting printing of a document, in accordance with a third embodiment of the principles described herein.

FIGS. 2, 6 and 8 illustrate various method 200, 600 and 800 for restricting the printing of documents, in accordance with embodiments described herein. The methods 200, 600 and 800 may be performed in the environment 100 of FIG. 1, and thus will be described with frequent reference to FIG. 1. For example, the methods 600 and 800 may be performed by the server 102 of FIG. 1 to restrict printing of the document 120. The method 200 may be performed by the client 101 and the server 102 in collaboration. If the client 101 and the server 102 are structured as described below for the computing system 1000 of FIG. 8, the methods 200, 600 and 800 may each be performed by the computing system 1000 by the hardware processing unit(s) 1002 executing computer-executable instructions present within the memory 1004, thereby causing the computing system 1000 to perform the methods.

Figure 3A:
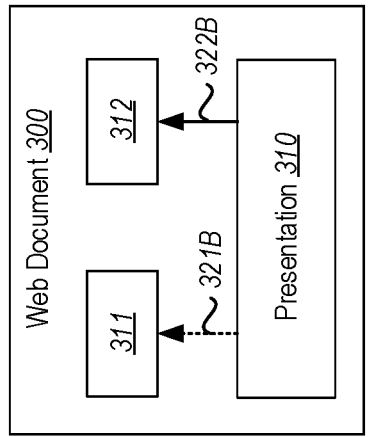
FIG. 3A schematically illustrates an example web document that includes a presentation component that controls how the web document appears during printing, by causing some element(s) to be visible, and some element(s) to be hidden.

FIG. 2 illustrates a flowchart of a method 200 for restricting printing of a document, in accordance with a first embodiment of the principles described herein. As an example only, this scenario might occur in the context of the client application 110 being a web browser, and the document 120 being a web document (such as a web page). FIG. 3A schematically illustrates an example web document 300 that includes a presentation component 310 that controls how the web document 300 appears during printing. In one example, the presentation component 310 is a stylesheet (such as a Cascading Style Sheets (CSS) format stylesheet). The presentation component 310 causes some elements (e.g., element(s) 311) of the document 300 to be visible (as represented by the solid-lined arrow 321A), and causes other elements (e.g., element(s) 312) of the document 300 to be hidden (as represented by the dotted-lined arrow 322A).

In the method 200 of FIG. 2, some acts are performed by a client (e.g., client 101 of FIG. 1), and are listed in the left column of FIG. 2 under the header "Client". Others of the acts are performed by a server (e.g., server 102 of FIG. 2), and are listed in the right column of FIG. 2 under the header "Server". The example of FIG. 2 might occur in the context of the application 110 being a web browser, and the document 120 being a web page.

The server causes a document to be provided to a client (act 221). Referring to FIG. 1, the server 102 provides (as represented by arrow 131) the document 120 to the client 101. This might occur should the application 110 navigate to a web site hosted by the server 102, and navigate to a web document within that web site, resulting in the document 120 being downloaded to the client 101. Accordingly, the client receives the document (act 211). Referring to FIG. 1, the client 101 receives (as also represented by arrow 131) the document 120.

Figure 4:
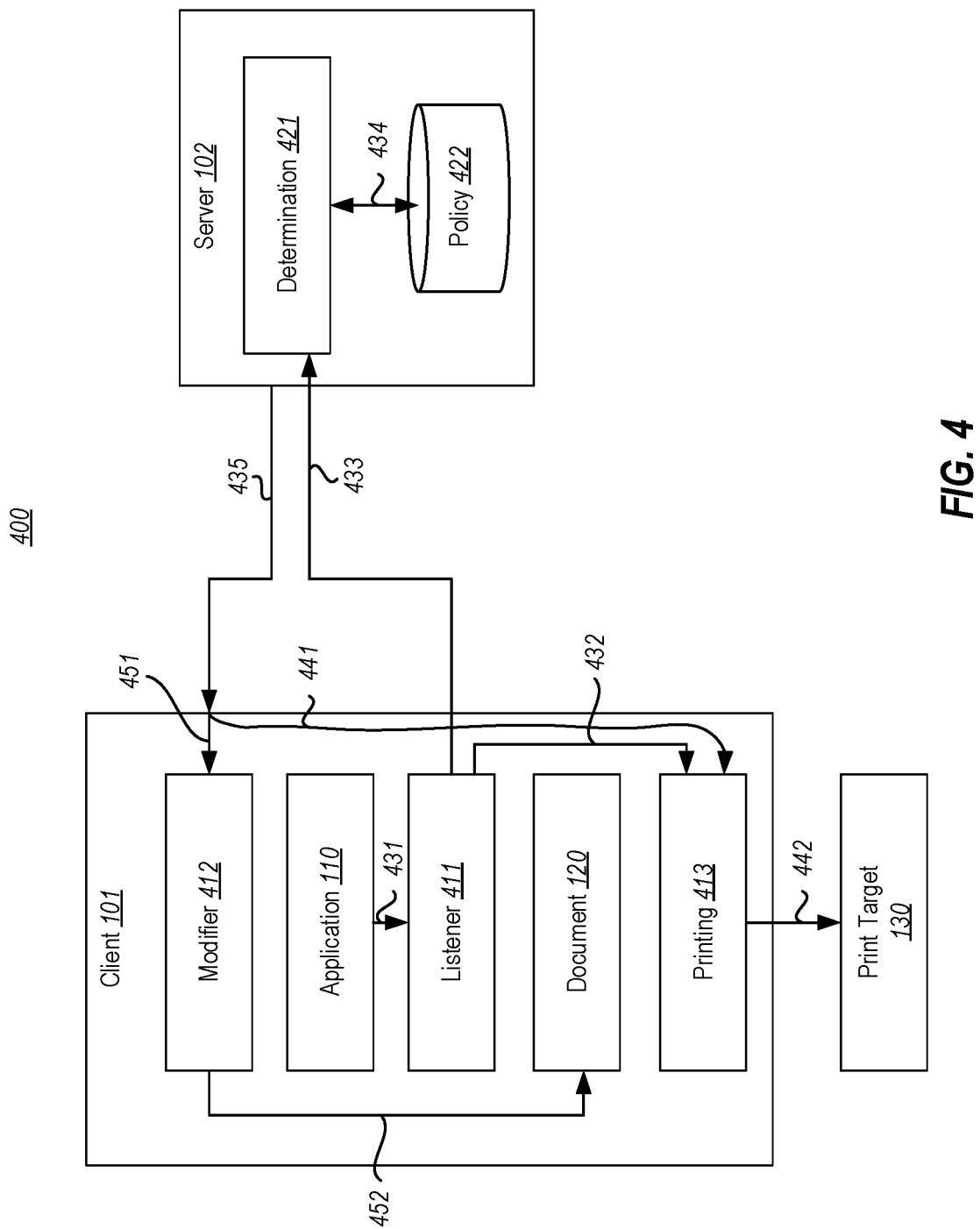
FIG. 4 illustrates a network environment that is similar to the network environment of FIG. 1, except now with components and process flows helpful for the first embodiment being illustrated.

Remaining portions of the method 200 may also now be described with respect to the environment 400 of FIG. 4, which is the same as the environment 100 of FIG. 1. However, the client 101 is now additionally shown with the document 120 downloaded, and with addition components including the listener component 411, the modifier component 412 and the printing component 413. Furthermore, the server 102 is additional shown with a determination component 411 and policy 412. Finally, various arrows 431 through 438 representing example process flows associated with the remaining parts of the method 200 of FIG. 2. If the client 101 and server 102 are each structured as described for the computing system 1000 of FIG. 10, each of these components may be structured as described below for the executable component 1006.

The remaining portions of the method 200 are initiated upon the user selecting to print the document. Referring to FIG. 4, this results in the application 110 issuing a print command that is represented by arrow 431. In response, the method 200 includes intercepting the print command (act 212). Referring to FIG. 4, the listener component 411 intercepts the print command, as represented by arrow 431. This may be accomplished by having the listener component listen for print events.

In response to intercepting the print command (act 212), the client pauses the corresponding print operation (act 213) and causes a print request to be sent to the server (act 214). In one embodiment, this pause as effected by performing a synchronous call in response to detecting a print event. Thus, this has the effect of pausing the print operation until the synchronous call is answered. The server that the print request (e.g., the synchronous call) is sent to could, but need not, be the same server that provided the document to the client in the first place. Referring to FIG. 4, the client 101 issues a print pause instruction (represented by arrow 432) to a printing component 413, thereby pausing the print operation of the document 120. In addition, the client 101 causes a print request (represented by arrow 433) to be sent to the server 102. Control of the print operation is now in the hands of the server (e.g., server 102).

The server then detects receipt of a print request to print the document (act 222). For example, in FIG. 4, the server 102 detects receipt of the print request that is represented by arrow 433. In response, the server determines whether or not the document is print restricted (decision block 223), or in other words, that printing of the document is to be blocked. In FIG. 4, this determination is made by a determination component 421 in consultation (as represented by bi-directional arrow 434) with print policy 422.

If the server determines that there are no print restrictions on the document ("No" in decision block 223), the server causes a positive response to the print request to be sent to the client (act 225). In FIG. 4, this positive response is represented by arrow 435. In response, the client unpauses the print operation (act 216) so that the document can be printed. In FIG. 4, the client 101 unpauses (as represented by arrow 441) the print operation, allowing the document 120 to be printed (as represented by arrow 442) since the document 120 presumably does not contain sensitive or confidential information.

On the other hand, if the server determines that the document is print restricted ("Yes" in decision block 223), the server prevents printing of the document as provided. Specifically, the server alters how the document is presented when printing (act 224). This may occur via a negative response to the print request, which is also represented by arrow 435 in FIG. 4. This results in the client altering the document (act 215). In FIG. 4, as represented by arrow 451, the modifier component 412 receives the negative response, and in response (as represented by arrow 452) modifies the document 120.

Figure 3B:
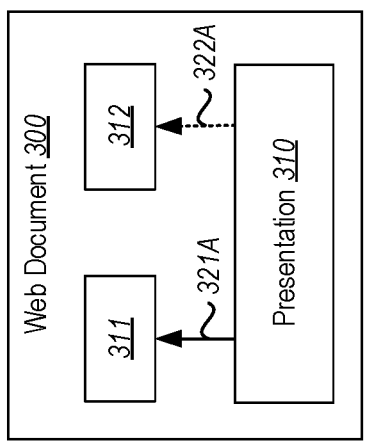
FIG. 3B illustrates the same web document as that of FIG. 3A, except now with the formerly visible element(s) being hidden, and the formerly hidden element(s) being visible.

This alteration is done in a manner that unpausing of the print command will no longer cause the document to be printed in a form in which the document existed at the time the print command was generated. In the example of FIG. 3A in which the document is a browser-viewable document (or a web document 300), this may be done by causing the presentation component 310 (e.g., a stylesheet) to be altered. As represented in FIG. 3B, this may cause one or more of the user interface elements 311 that were previously visible when printing (as represented by the solid-lined arrow 321A in FIG. 3A) to now be hidden when printing (as represented by the dotted-lined arrow 321B in FIG. 3B). Perhaps also the one or more of the user interface element 312 that were previously hidden when printing (as represented by the dotted-lined arrow 322A in FIG. 3A) are now visible when printing (as represented by the solid-lined arrow 322B in FIG. 3B).

As an example, the element(s) 311 of the web document may be the normal content of the document and contain sensitive information. On the other hand, the element(s) 312 of the web document might be a simple message that printing of the document is restricted. Thus, at this point, even if the document having sensitive information is attempted to be printed, the only thing that would print is a message that printing of the document is restricted. Thus here, if the user desires, printing of the document (e.g., the message that the print is restricted) may be unpaused (act 216).

As previously mentioned with reference to FIGS. 3A and 3B, the changing of how the document appears when printing may be done by interacting with a stylesheet of a web document—to change what elements are hidden and visible when printing. The following represents a CSS example showing how a CSS stylesheet may be overwritten to change what elements are visible and hidden (with line numbering added for ease of later reference:

1. BODY>*{
2. POSITION: ABSOLUTE!IMPORTANT;
3. TOP: −100PX!IMPORTANT;
4. BACKGROUND—COLOR: WHITE!IMPORTANT;
5. COLOR: WHITE!IMPORTANT;
6. OVERFLOW: HIDDEN!IMPORTANT;
7. TRANSITION: NONE!IMPORTANT;
8. VISIBILITY: HIDDEN!IMPORTANT;
9. DISPLAY: NONE!IMPORTANT;
10. }
11. BODY>H1.MCASBLOCKPRINTCSS {
12. VISIBILITY: VISIBLE!IMPORTANT;
13. COLOR: RED!IMPORTANT;
14. POSITION: ABSOLUTE!IMPORTANT;
15. TOP: 10PX!IMPORTANT;
16. DISPLAY: INLINE! IMPORTANT;
17. }

Line 1 instructs to take everything that is shown in the document. The term "IMPORTANT" in lines 2-9 means override everything that was defined before and perform only the definitions of lines 2-9. In line 11, the MCAS-BLOCKPRINTCSS is the only CSS element that is shown to the user during the print. As will be seen from FIG. 5C, that element is simply an indication that the print is restricted. Thus, in this embodiment, all visible elements are caused to be hidden, and the hidden element is caused to be visible. However, the policy 422 may permit more fine-grained control over what becomes hidden and visible on a per-document basis. For example, perhaps printing of the document is permitted essentially as it originally appears, except that one or two portions are hidden which were the only portions of the document that were sensitive.

Figure 5A:
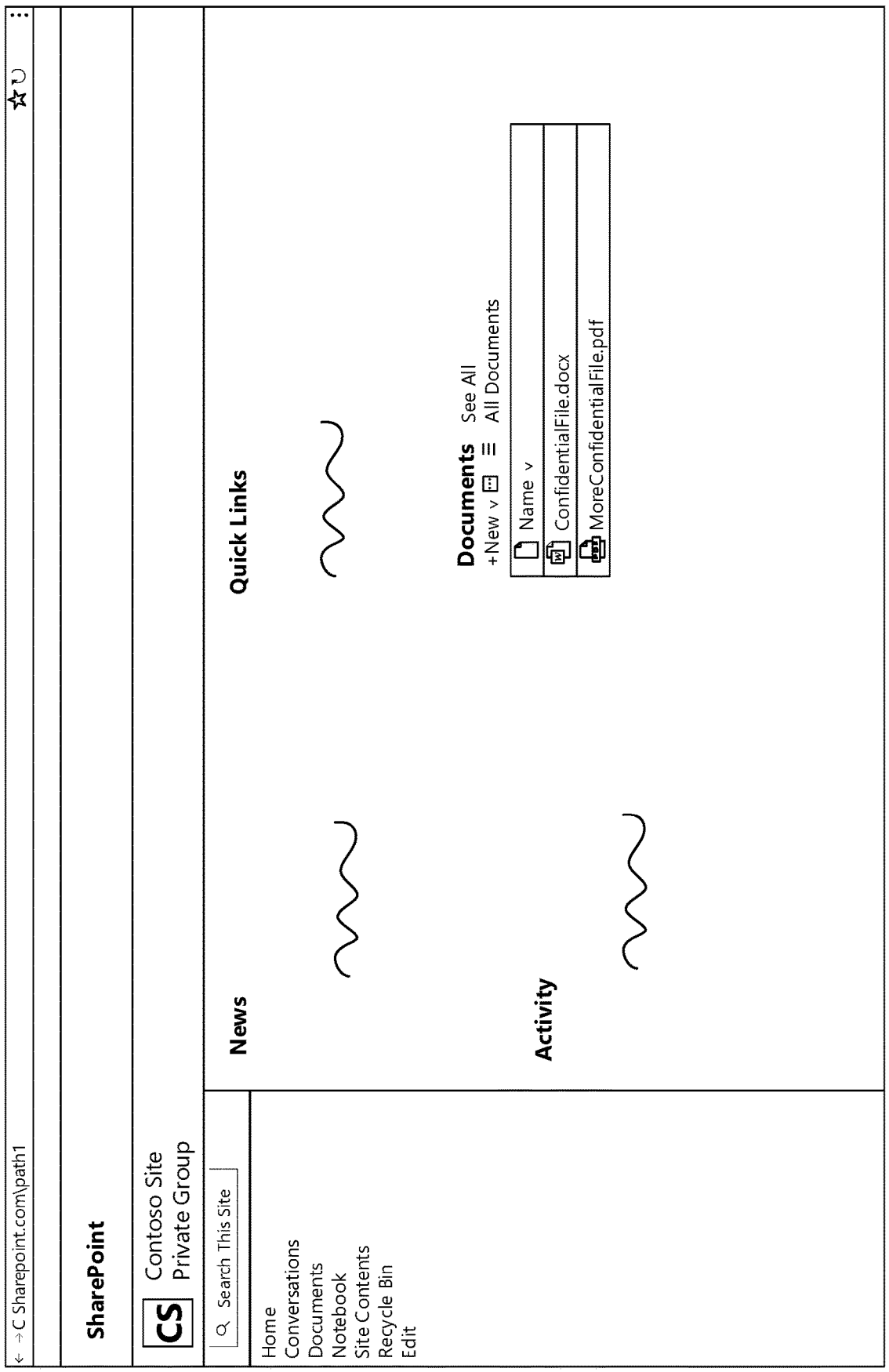
Figure 5C:
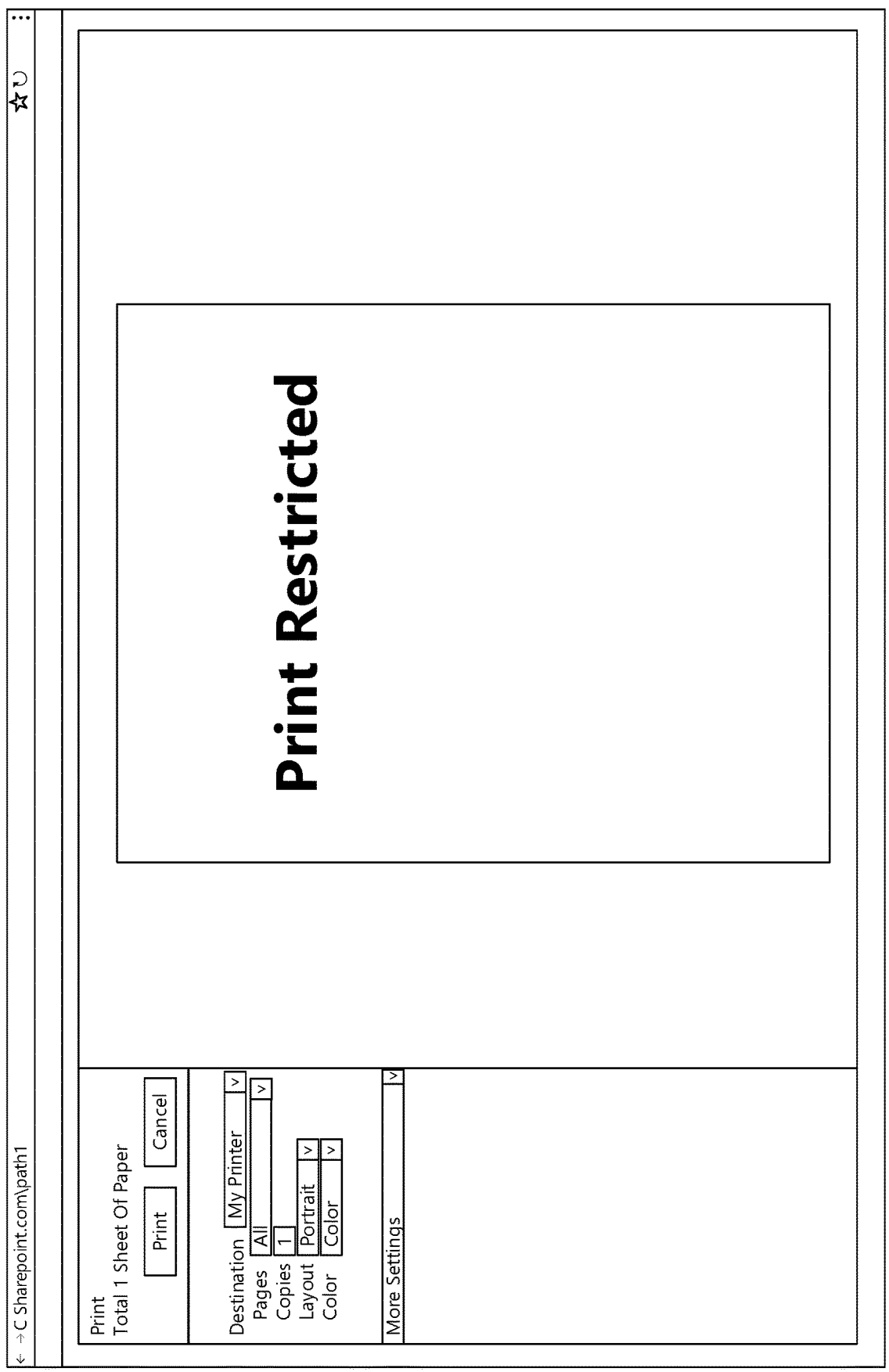
Figure 5D:
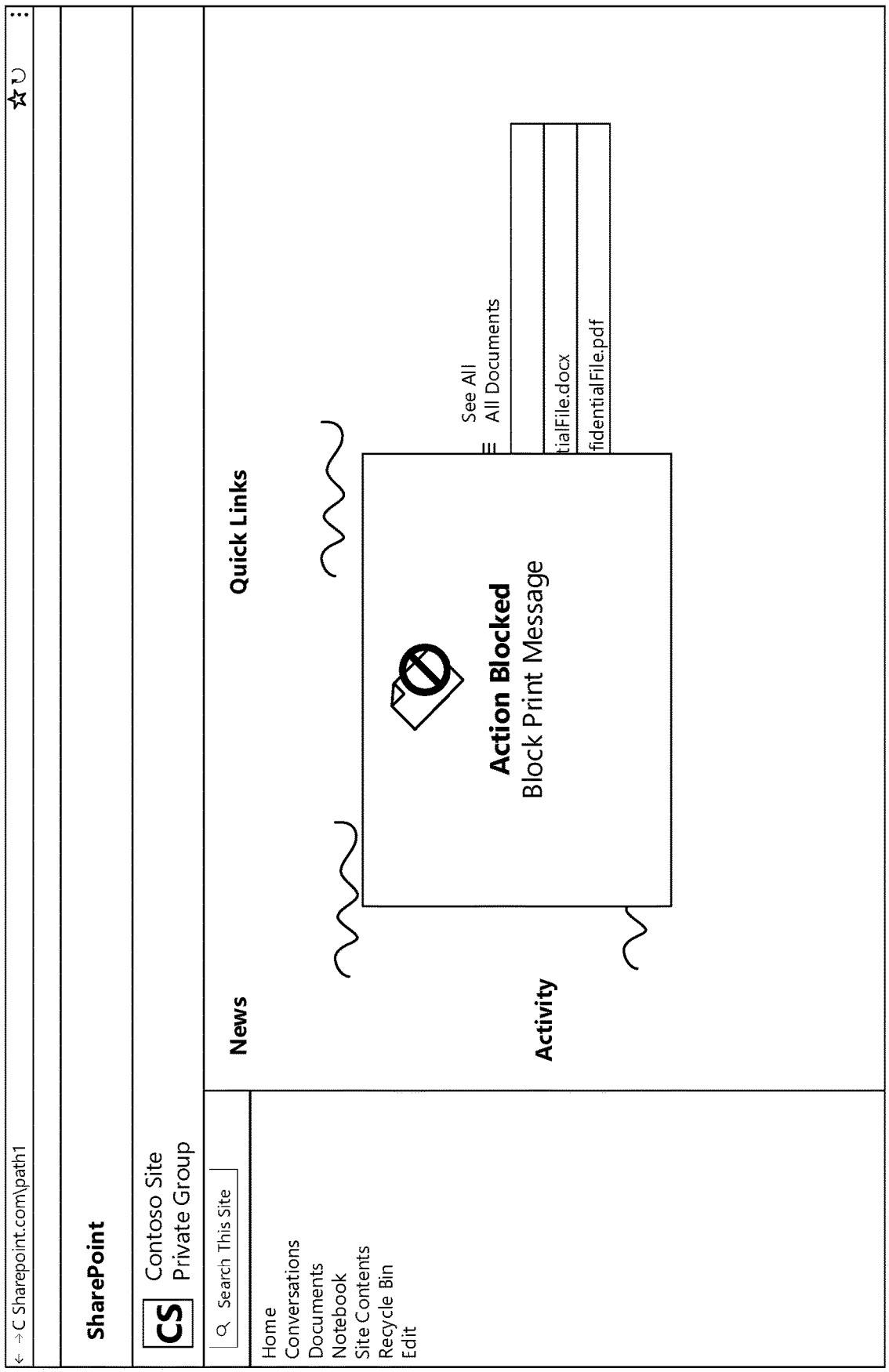

FIGS. 5A through 5D illustrates an example user experience when attempting to print a sensitive document. In FIG. 5A, the user is viewing a downloaded web document. In FIG. 5B, the user selects to print the web document. This triggers performance of the method 200 behind the scenes, causing the print view of the document to change. FIG. 5C illustrates that in the print pane, the user now sees that even if the user proceeds with the print, a print restricted notification is all that would be printed. Thus, the user is likely to cancel the print operation of his/her own accord. FIG. 5D illustrates another message indicating that the print command has been blocked.

FIG. 6 illustrates a flowchart of a method 600 for restricting printing of a document, in accordance with a second embodiment herein. The method 600 may be performed by a server prior to even providing a document. Referring to FIG. 1, the method 600 may be performed by the server 102 prior to providing the document 120 to the client 101.

The document 120 may be, for instance, a portable format document (such as a PDF document) that represents a printer-friendly version of a document that the user had previously viewed and perhaps edited on his/her client. Herein, a "portable format" document is any document having layout instructions and embedded fonts, so that the document appears the same (at least from a layout and font perspective) no matter where viewed.

As an example, the application 110 may be a client portion of an online application that permits an editable form of the document to be viewed online. If the user issues a request to print the document, this takes the form of a request to provide a portable format version of the document. Thus, prior to downloading the document, the server may convert the document being viewed or edited into a portable format document. Nevertheless, the server does not necessarily know that the portable format document is being provided for purposes of printing.

Referring to FIG. 6, the client issues a request to provide a document. This is not shown in FIG. 6, since the operation is a client-side operation, and FIG. 6 illustrates a flowchart of a method 600 that is performed at the server (such as the server 102 of FIG. 1). The server then receives the request to provide the document (act 601).

In response to detecting the request to provide the document (act 601), the server determines whether the document is print restricted (decision block 602). If the document is not print restricted ("No" in decision block 602), the server responds to the request to provide the document by actually providing the document (act 604). This permits the client to perform the print operation of the document. As an example, in FIG. 1, the server 102 provides the document 120 to the client 101, thereby permitting the client 101 to print the document 120.

In the embodiment illustrated in FIG. 6, even if the document is print restricted ("Yes" in decision block 602), the server might further still determine whether the document has metadata that will be interpreted by the client as instructions to print (decision block 603). As an example, a portable format document (such as a PDF document) might have metadata that instructs for the document to be printed immediately. This would be the case if the client is viewing and perhaps editing a document online, and requests to print the document. As an example, that metadata can be an embedded javascript snippet instructing to immediate print the document once loaded into the browser. Accordingly, regardless of whether or not the document is print restricted ("Yes" in decision block 602), the document may still be provided (act 604) if the metadata does not instruct to print ("No" in decision block 603).

However, in the broader case, if printing is restricted ("Yes" in decision block 602), then the document to be provided is instead replaced with another document (act 605). In the embodiment in which the server also checks the metadata of a portable format document (decision block 603), if both the printing is restricted ("Yes" in decision block 602), and the metadata indicates that the document will be printed ("Yes" in decision block 603), then the portable format document is replaced with another portable format document (act 605). Then, the replacement document is provided to the client (act 606) instead of the originally requested document (as in act 604).

This replacement document may simply be a document that specifies that the printing operation is not allowed. Accordingly, even though the user was able to view and perhaps edit the document that contains sensitive or confidential information, the user was again blocked from printing the document that contains sensitive or confidential information.

Figure 7A:
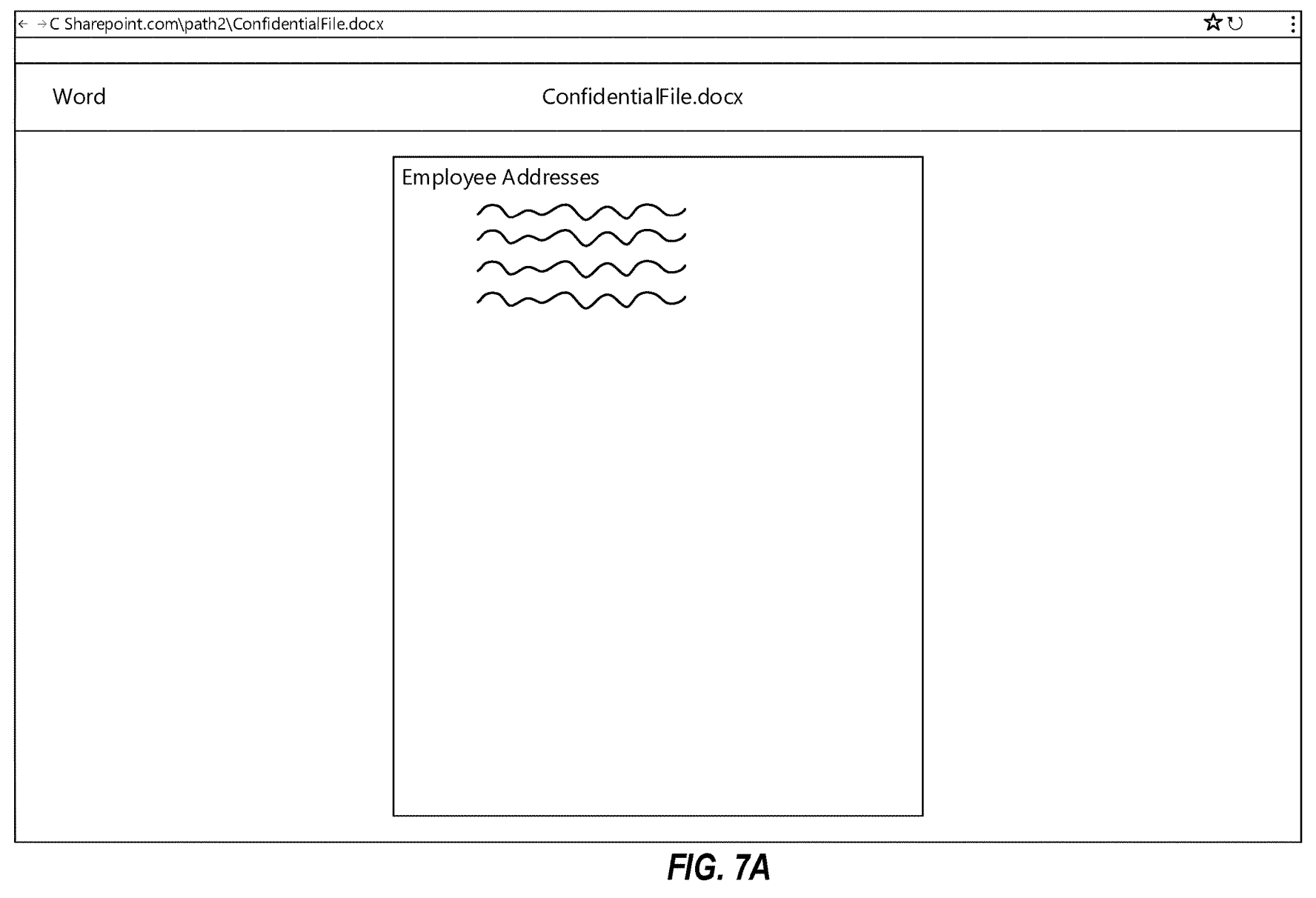
Figure 7B:
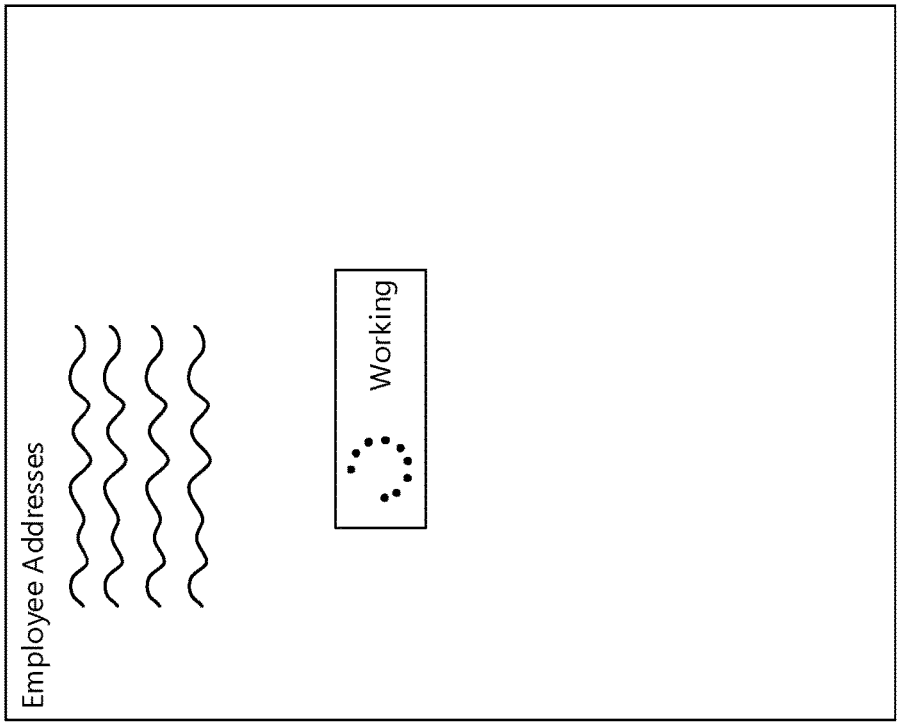
Figure 7C:
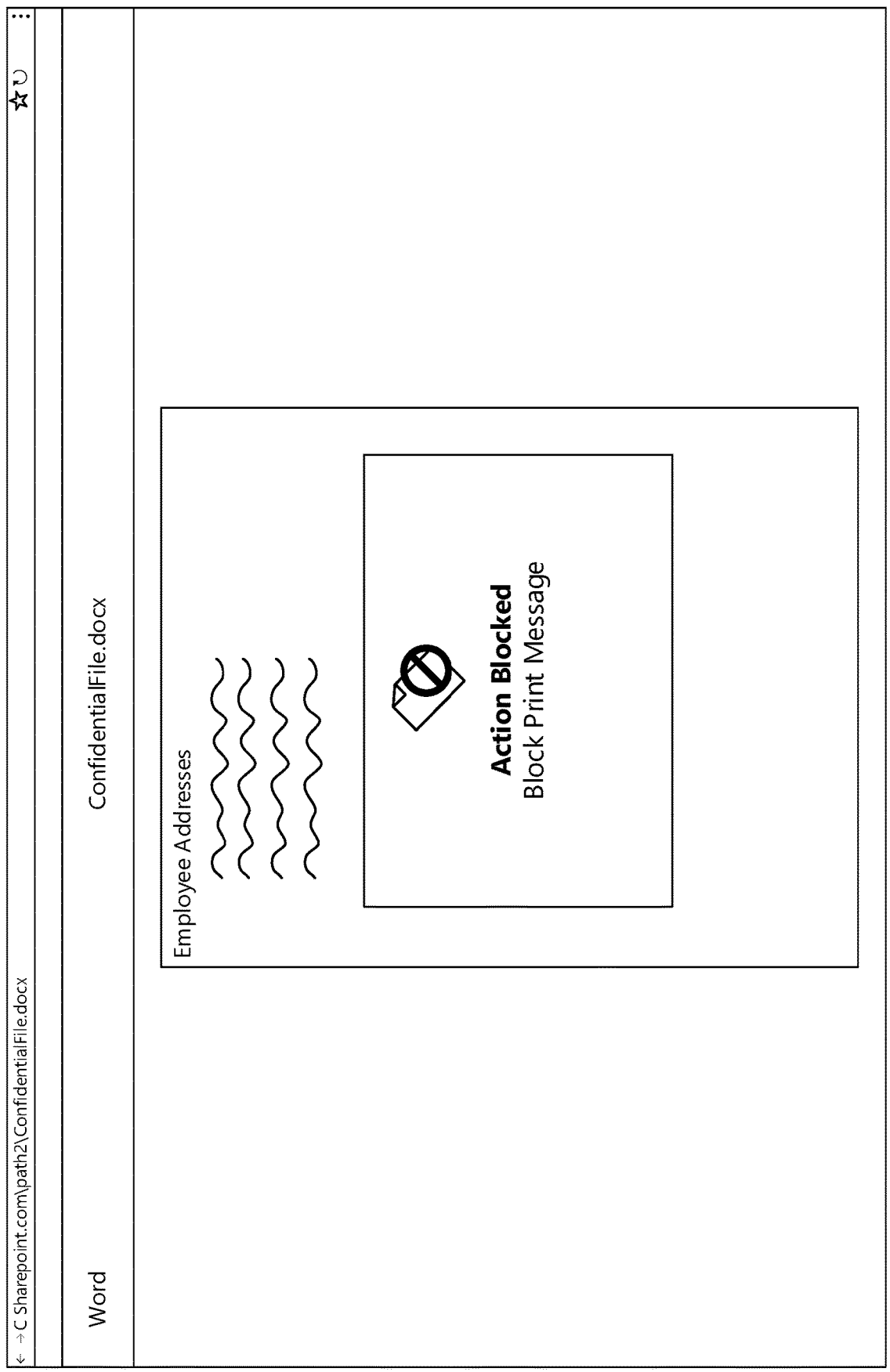
Figure 7D:
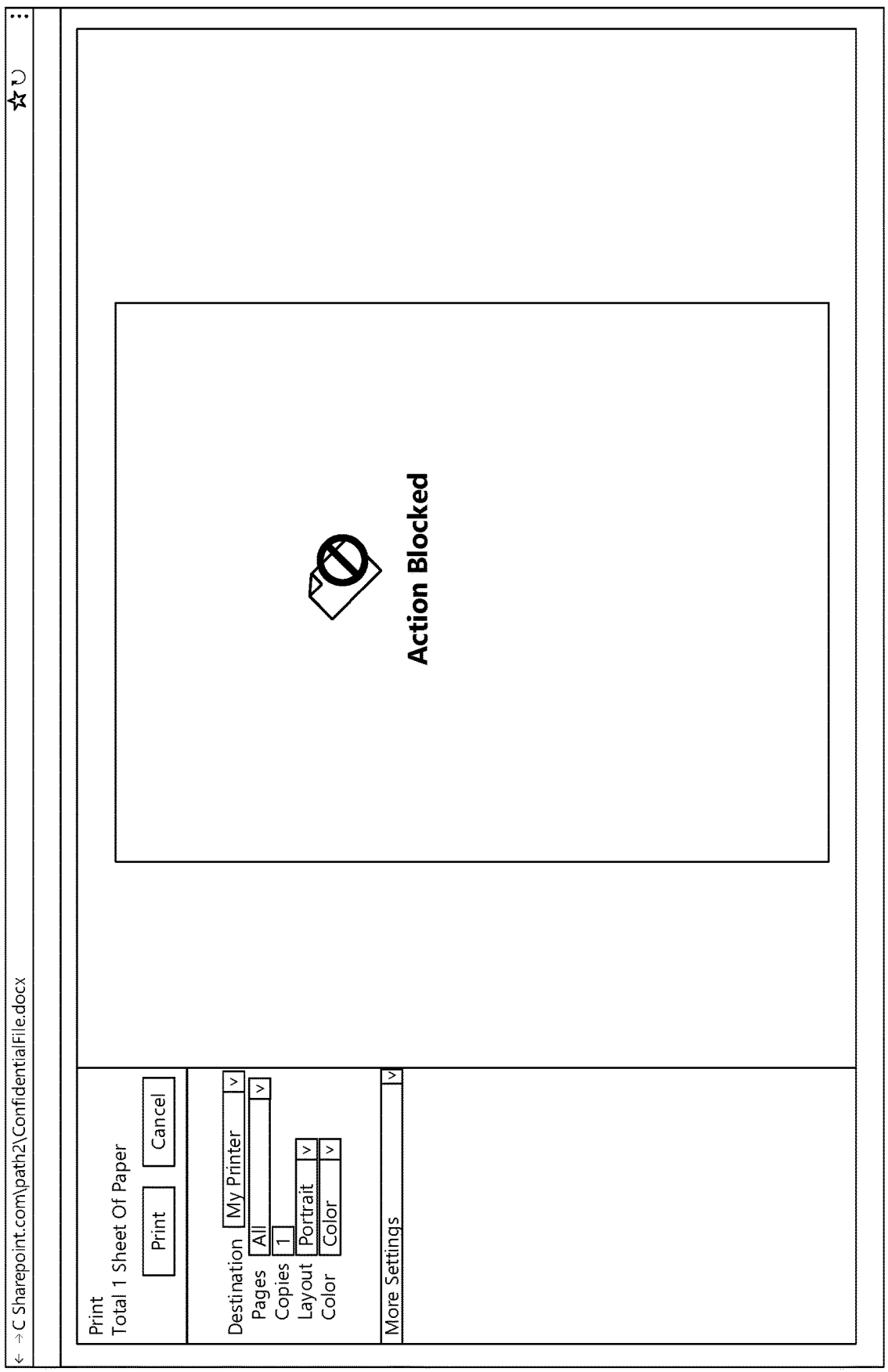

FIGS. 7A through 7D illustrate an example user experience associated with this second embodiment. In FIG. 7A, the user is viewing and perhaps editing an online word processing document. FIG. 7B illustrates that after the user instructs to print the document, the client system attempts to acquire a corresponding PDF document of the online document. FIG. 7C illustrates a user interface in which the user is informed that the printing is blocked. FIG. 7D illustrates a print interface that shows the replacement document that was downloaded in lieu of the document that contained the sensitive or confidential information.

FIG. 8 illustrates a flowchart of a method 800 for restricting printing of a document, in accordance with a third embodiment herein. The method 800 may be performed by a server prior to even providing a document. Referring to FIG. 1, the method 800 may be performed by the server 102 prior to providing the document 120 to the client 101. In this embodiment, the document may be a document that the user has access to via a remote application—such as a file sharing application, or a remote storage service. Again, the document 120 may be, for instance, a portable format document (such as a PDF document) that represents a printer-friendly document. In this case, the accessed document may already be a portable format document (such as a PDF document) as stored on the online drive.

Referring to FIG. 8, the client issues a request to provide a document. This is not shown in FIG. 8, since the operation is a client-side operation, and FIG. 8 illustrates a flowchart of a method 800 that is performed at the server (such as the server 102 of FIG. 1). The server then receives the request to provide the document (act 801).

In response to detecting the request to provide the document (act 801), the server determines whether the document is print restricted (decision block 802). If the document is not print restricted ("No" in decision block 802), the server responds to the request to provide the document by actually providing the document (act 803). This permits the client to perform the print operation of the document. As an example, in FIG. 1, the server 102 provides the document 120 to the client 101, thereby permitting the client 101 to print the document 120.

If the printing is restricted ("Yes" in decision block 802), then the document is altered (act 804) so that the document is restricted from printing as requested. As an example, the document may be made to be read-only by editing the metadata of the document to reflect read-only status. The altered document is then provided to the client (act 805). Thus, the client will not provide controls which permit the document to be printed.

Figure 9A:
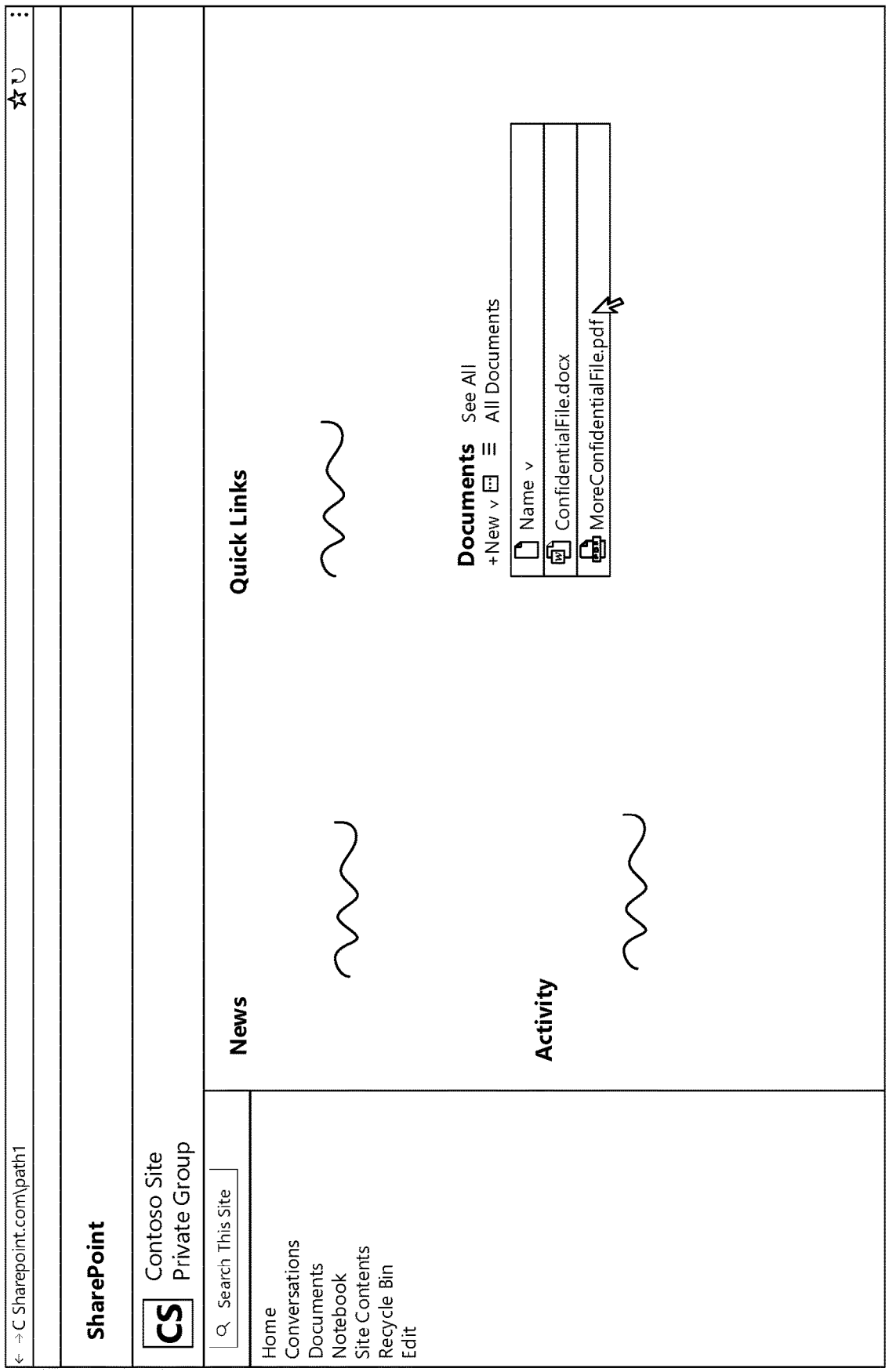
Figure 9B:
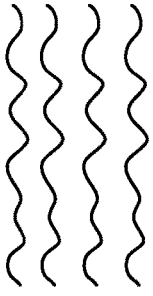
Figure 9C:
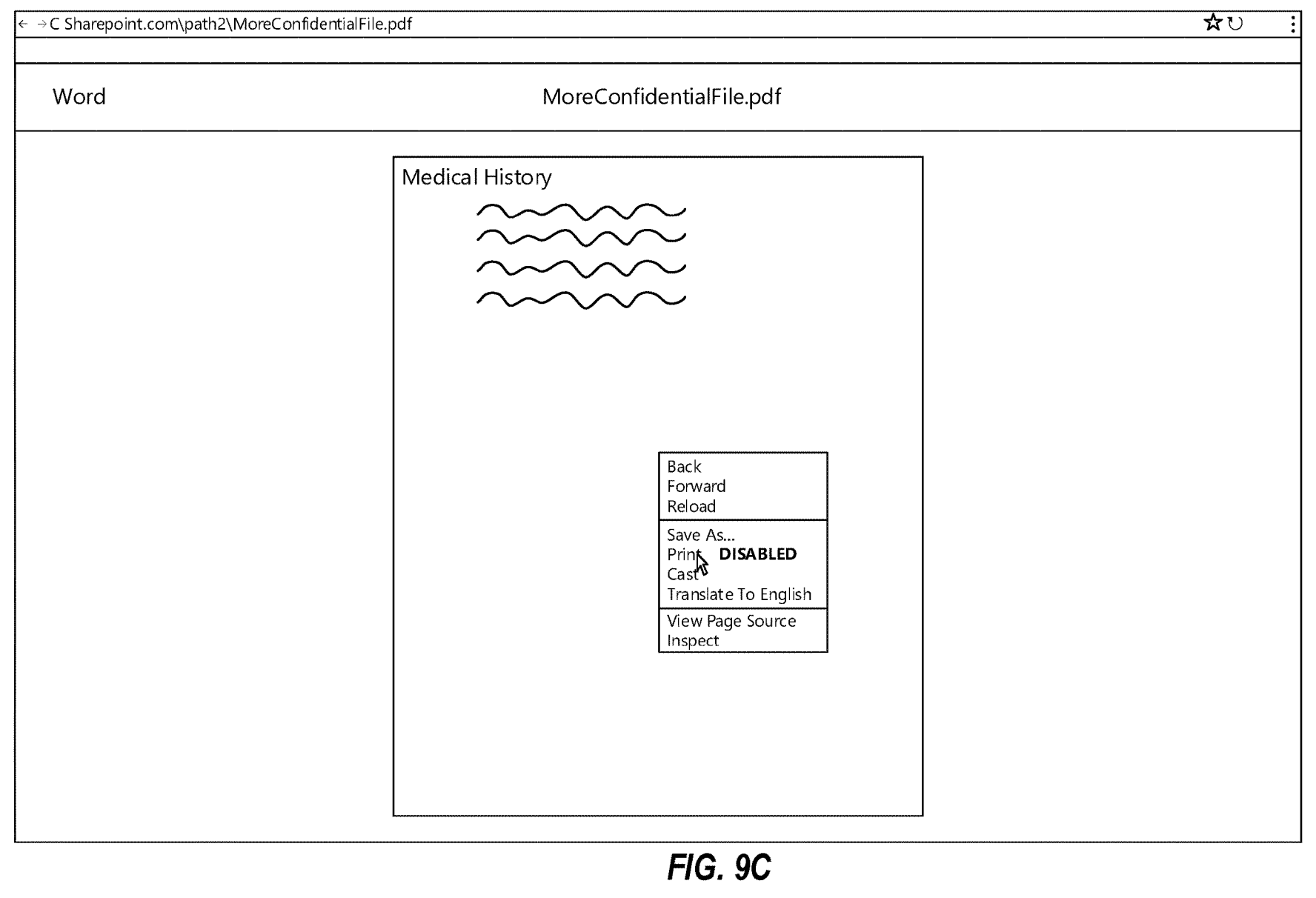

FIGS. 9A through 9C illustrate an example user experience associated with this third embodiment. In FIG. 9A, the user is viewing a file sharing site and aims to open a PDF document. FIG. 9B shows the open PDF document after it has been downloaded. But the PDF document has been made to be read-only. Accordingly, if the user tries to print the document, as shown in FIG. 9C, the print control is deemphasized to represent that the printing control is disabled for this document. Thus, the user is prevented from printing the sensitive content.

As previously mentioned, the performance of the methods 200, 600 and 800 may be performed by a computing system. Accordingly, a computing system will now be described with respect to FIG. 10. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 10:
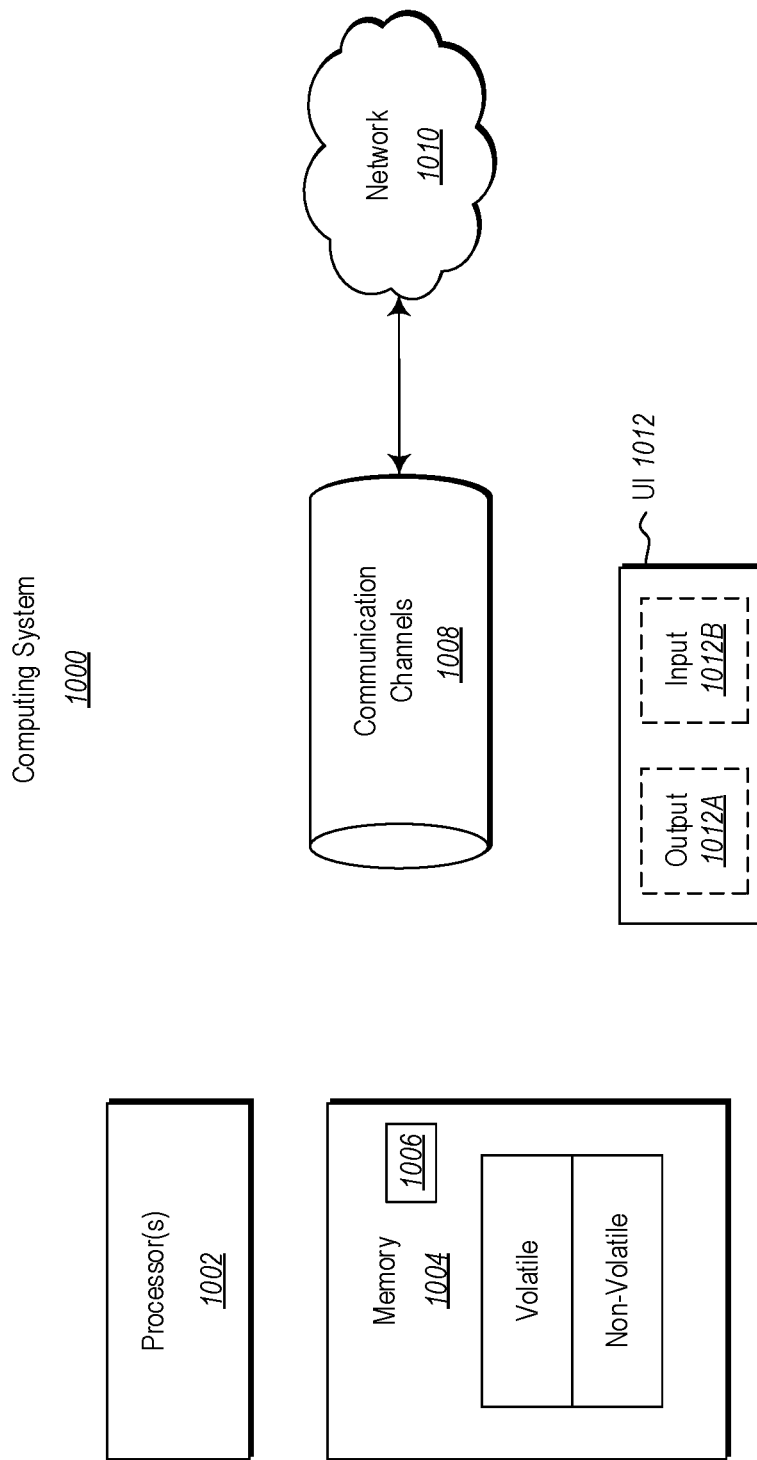
FIG. 10 illustrates an example computer system in which the principles described herein may be employed.

As illustrated in FIG. 10, in its most basic configuration, a computing system 1000 typically includes at least one hardware processing unit 1002 and memory 1004. The memory 1004 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1000 has thereon multiple structures often referred to as an "executable component". For instance, the memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface 1012 for use in interfacing with a user. The user interface 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, holograms, virtual reality, and so forth. Examples of input mechanisms 1012B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks.

In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to restrict printing of a document, said computing system comprising:
   one or more processors; and
   one or more computer-readable hardware storage devices that store instructions that are executable by the one or more processors to cause the computing system to at least:
      intercept a print command to print a document provided to the computing system;
      in response to intercepting the print command, pause a corresponding print operation and cause a print request to be sent to a server;
      if a negative response to the print request is received from the server, alter the document so that unpausing of the print command will no longer cause the document to be printed in a form in which the document existed at a time the print command was generated, wherein altering the document includes editing metadata of the document to reflect a read-only status such that the edited metadata results in the document being restricted from printing as requested;
      in response to the negative response and in response to the document being altered, display a print pane that displays a print restricted notification representative of content that is to be subsequently printed, the print restricted notification being displayed in lieu of the document as the document existed at the time the print command was generated; and
      if a positive response to the print request is received from the print authorization server, unpause the print command so that the document is printed.

2. The computing system in accordance with claim 1, wherein:
   the document is a browser-viewable document,
   the browser-viewable document has a stylesheet that controls how the browser presents the browser-viewable document, and
   altering the document includes altering the stylesheet so as to make visible the print restricted notification.

3. A method performed by a server for restricting printing of a document, the method comprising:
   causing a document to be provided to a client computing system;
   after providing the document, detecting a receipt of a request to print the document;
   in response to detecting the receipt, determining that the document is print restricted;
   in response to the determination that the document is print restricted, preventing printing of the document as provided, wherein:
      preventing said printing includes triggering display of a print pane that displays a print restricted notification representative of content that is to be subsequently printed, the print restricted notification being displayed in lieu of the document as the document existed at the time the request to print the document was received, and
      preventing said printing further includes causing metadata of the document to be edited to reflect a read-only status such that the edited metadata results in the document being restricted from printing as requested.

4. The method in accordance with claim 3, wherein:
   the document is a browser-viewable document,
   causing the document to be provided to the client computing system comprises causing the document to be downloaded to the client computing system; and
   preventing printing of the document comprises causing the document to change how it is presented when printing.

5. The method in accordance with claim 4, the browser-viewable document having a presentation component that controls how the browser presents the browser-viewable document,
   the causing of the document to change how it is presented comprising:
   causing the presentation component to be altered.

6. The computing system in accordance with claim 5, the presentation component being a stylesheet.

7. The method in accordance with claim 6, the causing of the presentation component to be altered comprising:
   causing the print restriction notification to become visible by adjusting the stylesheet.

8. The method in accordance with claim 7, a separate print restriction notification is within the document as provided but is hidden by the stylesheet in the document as provided.

9. The method in accordance with claim 3, the document being a first document, the method further comprising:
   causing a second document to be provided to the client computing system;
   after providing the second document, detecting a receipt of a request to print the second document;
   in response to detecting the receipt of the request to print the second document, determining that the second document is not print restricted; and
   in response to the determination that the document is not print restricted, allowing printing of the document as provided.

10. A computing system configured to restrict printing of a document, said computing system comprising:
    one or more processors; and
    one or more computer-readable hardware storage devices that store instructions that are executable by the one or more processors to cause the computing system to at least:
      detect a receipt of a request to provide a document;
      in response to detecting the receipt, determine that the document is print restricted;
      in response to the determination, replace the document or alter the document so that the document is restricted from printing as requested, wherein restricting said printing includes triggering display of a print pane that displays a print restricted notification representative of content that is to be subsequently printed, the print restricted notification being displayed in lieu of the document as the document existed at the time the request to provide the document was received, and wherein replacing or altering the document includes editing metadata of the document to reflect a read-only status such that the edited metadata results in the document being restricted from printing as requested; and
      after altering or replacing the document, provide the altered or replaced document in response to the request.

11. The computing system in accordance with claim 10, the document being a portable format document.

12. The computing system in accordance with claim 11, the replacing of the document comprising replacing the portable format document with another portable format document, such that the other portable format document is provided in response to the request.

13. The computing system in accordance with claim 12, wherein
    execution of the instructions further causes the computing system to:
      in response to detecting the receipt, determine that the portable format document has particular metadata that instructs to print, the replacing of the document also being in response to the determination that the portable format document has the particular metadata, which instructs to print.

14. The computing system in accordance with claim 11, the altering of the portable format document comprising making the portable format document read-only.

15. The computing system in accordance with claim 14, the computing system also having a file-sharing application.

16. The computing system in accordance with claim 10, the computing system running an online application that permits an editable form of the document to be viewed online, the request to provide the document being generated in response to the viewing system that is viewing the document selecting to print the editable form of the document.

17. The computing system in accordance with claim 16, the online application having a print control that the viewing system can interface with in order to select to print the document.

18. The computing system in accordance with claim 10, the replacing of the document comprising replacing the document with another document, such that the other document is provided in response to the request.

19. The computing system in accordance with claim 10, wherein execution of the instructions further causes the computing system to:
    in response to detecting the receipt, determine that the document has particular metadata that instructs to print, the replacing of the document also being in response to the determination that the document has the particular metadata, which instructs to print.

20. The computing system in accordance with claim 10, the altering of the document comprising making the document read-only.

* * * * *